United States Patent [19]

Dischert et al.

[11] Patent Number: 4,538,236
[45] Date of Patent: Aug. 27, 1985

[54] ADAPTIVE DIGITAL SIGNAL CORING CIRCUIT

[75] Inventors: Robert A. Dischert, Burlington, N.J.; William H. Meise, Wrightstown, Pa.

[73] Assignee: RCA Corporation, Princeton, N.J.

[21] Appl. No.: 422,667

[22] Filed: Sep. 24, 1982

[51] Int. Cl.³ .................... H04B 15/00; H04N 5/14
[52] U.S. Cl. .................................. 364/574; 328/165; 358/36; 358/166; 364/724
[58] Field of Search ............ 364/514, 570, 574, 724; 358/36, 37, 166, 167; 328/165, 166, 167

[56] References Cited

U.S. PATENT DOCUMENTS

| 3,716,726 | 2/1973 | Trimble | 307/237 |
|---|---|---|---|
| 3,979,683 | 9/1976 | Ikeda | 328/165 |
| 4,004,140 | 1/1977 | Izumi et al. | 235/152 |
| 4,064,530 | 12/1977 | Kaiser et al. | 364/724 X |
| 4,118,785 | 10/1978 | Izumi et al. | 364/754 |
| 4,157,457 | 6/1979 | Sakoe et al. | 364/724 X |
| 4,167,749 | 9/1979 | Burrus | 358/8 |
| 4,240,106 | 12/1980 | Michael et al. | 358/36 |
| 4,250,458 | 2/1981 | Richmond et al. | 329/112 |
| 4,303,943 | 12/1981 | May | 358/167 |
| 4,305,091 | 12/1981 | Cooper | 358/36 |
| 4,350,995 | 9/1982 | Harlan | 358/166 X |
| 4,394,684 | 7/1983 | Verhoeven | 364/724 X |
| 4,399,460 | 8/1983 | Harwood et al. | 358/166 |
| 4,422,094 | 12/1983 | Lewis, Jr. et al. | 358/37 |
| 4,437,123 | 3/1984 | Harlan | 358/166 |
| 4,437,124 | 3/1984 | Cochran | 358/166 |
| 4,441,121 | 4/1984 | Harwood et al. | 358/37 |

FOREIGN PATENT DOCUMENTS 2059203 9/1980 United Kingdom .

OTHER PUBLICATIONS

"Digital Television Image Enhancement", John P. Rossi, Journal of the SMPTE, vol. 84, Jul. 1975, pp. 545-551.
J. P. Rossi, "Digital Techniques for Reducing Television Noise", SMPTE Journal, vol. 87, Mar. 1978, pp. 134-140.
DBA Corporation Technical Manual for TV Tracker Model 606, pp. 1-10-4-3.

Primary Examiner—Errol A. Krass
Assistant Examiner—Kevin J. Teska
Attorney, Agent, or Firm—E. M. Whitacre; P. J. Rasmussen; C. A. Berard, Jr.

[57] ABSTRACT

A digital signal coring circuit removes from a stream of incoming digital data words low-valued variations lying between upper and lower threshold reference values. Upper and lower threshold values are adjusted in response to the value of the outgoing cored digital data words so that such low-valued variations are removed over the entire range of values of the digital data words, and not merely around a baseline value.

12 Claims, 5 Drawing Figures

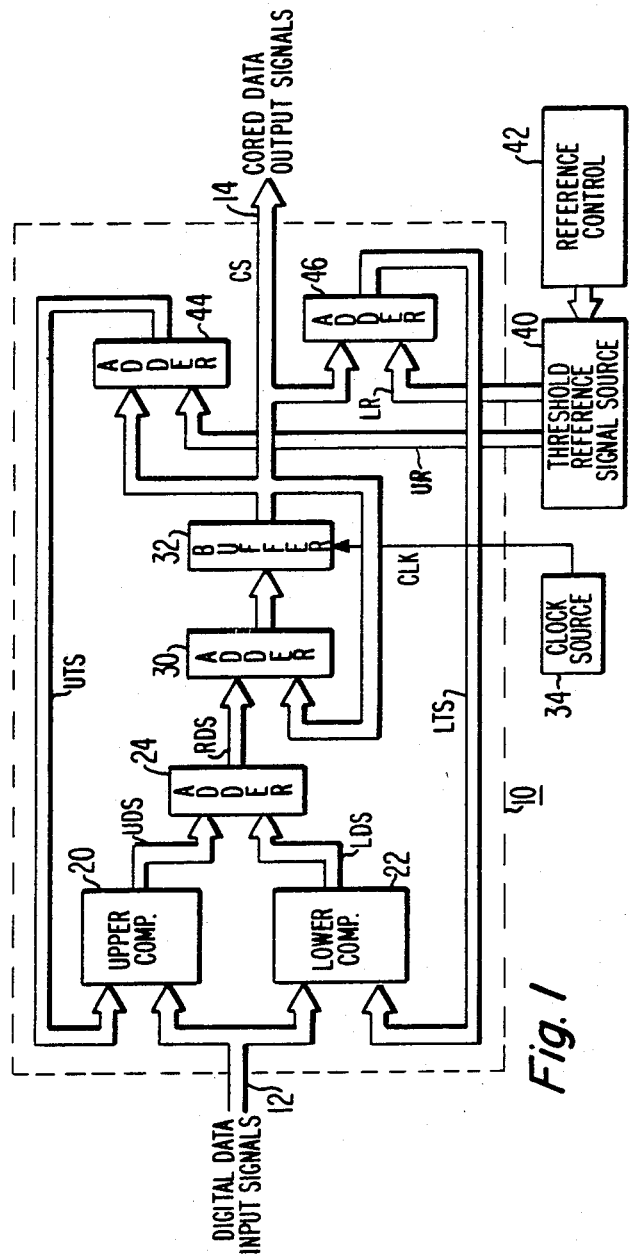
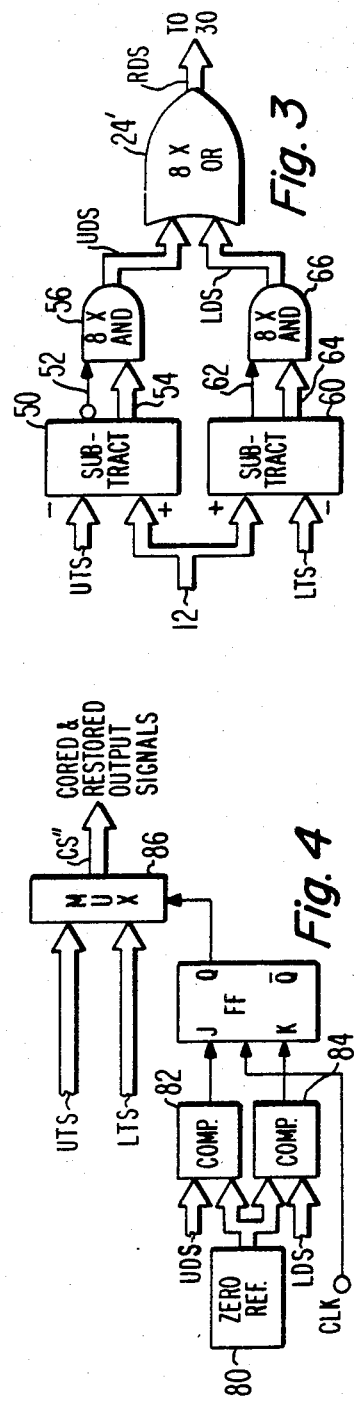
Fig. 1
Fig. 3
Fig. 4

ADAPTIVE DIGITAL SIGNAL CORING CIRCUIT

This invention relates to digital signal processing apparatus and, in particular to digital signal coring apparatus.

BACKGROUND OF THE INVENTION

Electrical signals unavoidably include a desired information signal portion and an undesired noise signal portion. The term "signal-to-noise ratio" (SNR) is commonly used to describe the relative strengths of the information and noise signal portions. The performance of electronic equipment generally improves as signal-to-noise ratio is increased. One technique employed to decrease the effects of noise signals and thereby increase SNR is a coring circuit.

A conventional coring circuit removes the center values of a signal, i.e. it provides an output signal only when the input signal is outside a defined range of values. The range of values for which no output signal is provided encompasses a zero or baseline signal value and is usually symmetrical with respect to the baseline signal value. Moreover, in conventional corers, the defined range of values is fixed.

As a result, a conventional coring circuit is effective to remove low level noise signals only when no substantial information signals are present. In other words, noise signals around the baseline level are cored out but noise signals superimposed upon information signals are passed along with the information signals. Moreover, the defined coring range of a conventional coring circuit is not readily changed and so cannot adapt to varying levels of noise signals.

SUMMARY OF THE INVENTION

These limitations are overcome by the adaptive digital signal coring apparatus of the present invention which comprises comparison devices for developing digital signals representative of the departure of input digital signals from a range of values determined by first and second digital signals. Apparatus is provided for modifying the range of values in accordance with the representative digital signals.

BRIEF DESCRIPTION OF THE DRAWINGS

In the Drawing:

FIG. 1 is a schematic diagram of apparatus including an embodiment of the present invention;

FIG. 3 is a block diagram of a digital circuit element which may be substituted for the FIG. 1 elements 20, 22 and 24; and FIG. 4 is a block diagram of circuit elements which may be added to the FIG. 1 circuit to provide an alternate output signals.

DETAILED DESCRIPTION

Figure 2A:
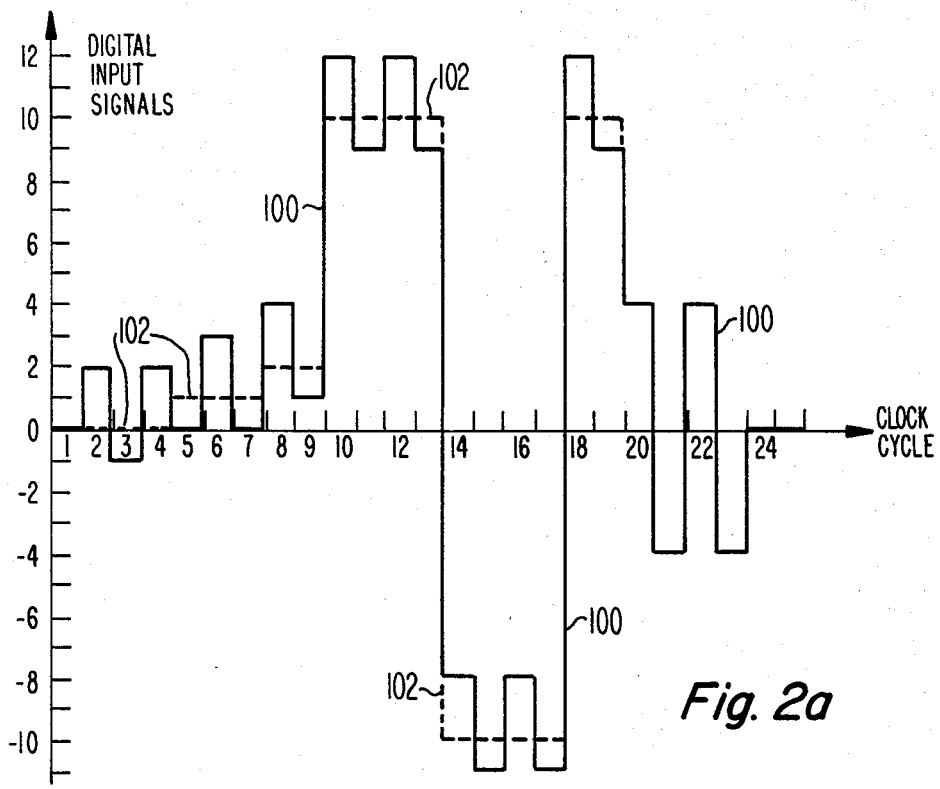
FIG. 2a is a waveform of exemplary quantized digital signals which may be applied to the FIG. 1 apparatus.

Digital data input signals comprising a sequence of parallel-bit digital words are applied to adaptive digital signal coring apparatus 10 at input 12. Corer 10 supplies cored data output signals CS comprising a similar stream of parallel digital words at its output 14.

In the FIGURES, broad arrows indicate paths for parallel-bit digital signals, for example, eight-bit digital words representing values of luminance and chrominance information in a digital television signal processing system. Arrows using single lines indicate paths carrying either a single digital bit, a serial-bit digital word or a continuous signal, for example, control signals or clocking signals.

Eight-bit digital comparator 20 receives at its inputs the digital signals from input 12 and an upper threshold digital signal UTS. Threshold signal UTS determines the upper boundary of a range of digital values to be cored. Upper comparator 20 develops therefrom an eight-bit upper digital difference signal UDS which has a value representative of the difference between the input digital signal and the threshold signal UTS when the input digital signal exceeds UTS. in other words, non-zero valued signals UDS are developed when the input digital signal value is greater than UTS and outside the range of coring values. Otherwise, difference signal UDS has zero value.

Eight-bit lower digital comparator 22 receives at its inputs the digital signals from input 12 and a lower threshold digital signal LTS which determines the lower boundary of the range of values to be cored. Lower comparator 22 develops therefrom an eight-bit lower digital difference signal LDS which has a value representative of the difference between the input digital signal and the threshold signal LTS when the input digital signal exceeds LTS in the sense opposite to that employed by comparator 20. In other words, non-zero valued signals LDS are developed when the input digital signal value is less than LTS and outside the range of coring values. Otherwise, difference signal LDS has zero value.

Difference signals UDS and LDS are combined by eight-bit adder 24 to develop an eight-bit digital signal RDS, the value of which represents the degree to which the input digital signal departs from the range of values to be removed by coring and the sense associated with such departure. Thus, representative signal RDS will have zero value when the input signal value is within the range of values having boundaries determined by threshold signals UTS and LTS. In addition, RDS will be, for example, a positive-valued difference when the input signal value is greater than threshold UTS and will be a negative-valued difference when the input signal value is below the threshold value LTS.

Clocking signals CLK from source 34 are developed synchronously with the rate at which the digital words of the input digital signal are received. In a digital television system, clock source 34 is the sampling clock source which causes an analog-to-digital converter to convert incoming analog video signals into a sequence of digital words at a rate of three or four times the color subcarrier frequency. Eight-bit adder 30 combines the representative digital signals RDS and the digital word stored in eight-bit buffer 32 received at its respective inputs to develop the sum thereof which is applied to the input of eight-bit buffer register 32. In response to the clocking signal CLK from source 34, the summed signal is stored in buffer 32 replacing the previous contents thereof. Thus, for each digital word of the input signal, the contents of buffer 32 are updated to reflect the result of the comparisons performed by digital comparators 20 and 22.

The stored contents of buffer 32 are supplied as the cored digital output signals CS at output 14 of corer 10.

The stored contents of buffer 32 are further employed to develop threshold signals UTS and LTS referred to above.

Threshold reference signal source 40 develops upper reference signal UR and lower reference signal LR in response to control signals supplied by reference control 42. Control 42 can be a manual input device such as thumbwheel switches for establishing the boundary values of the coring range. Alternatively, control 42 can include apparatus for determining the coring range in response to indications of the level of noise signal present on the received television signals. Suitable indications could be developed, for example, from the RF AGC level in the tuning system of the TV receiver, from the average value of cored signal CS, or from the peak-to-peak excursions of cored signal CS.

Reference source 40 comprises two memory registers which store the digital words supplied as reference signals UR and LR, respectively. The values of UR and LR are loaded into the memory registers from reference control 42. UR and LR can each be up to eight bits in length but are usually of lesser length in an eight-bit digital television signal processing system. Reference signals UR and LR establish the upper and lower boundaries of a coring range with respect to a baseline (e.g., zero) signal value.

Upper reference signal UR is combined with the digital value stored in buffer 32 by eight-bit adder 44 to produce the upper threshold signal UTS. Lower reference signal LR is combined with the digital value stored in buffer 32 by eight-bit adder 46 to produce the lower threshold signal LTS. Where the baseline signal value is zero, UR is a positive digital value and LR is a negative digital value. The difference between reference signals UR and LR establishes the magnitude of the coring range.

Because UR and LR are added to the contents of buffer 32 which reflect the cored signal magnitude, threshold signals UTS and LTS reflect the magnitude of the coring range established by UR and LR but with respect to a baseline value modified by the cored signal magnitude. As a result, the coring operation performed by digital comparators 20 and 22, adders 24 and 30, and buffer 32 removes variations of the digital input signal which are of lesser magnitude than the coring range (UTS-LTS) over the entire range of values of the digital input signal, and not merely around a fixed baseline value. Coring apparatus 10 is therefore adaptive in that it modifies the baseline of the coring range in accordance with the input digital signal values.

The coring operation described above is illustrated by TABLE I below which lists the values of the various digital signals produced in response to an exemplary series digital input signal words. In the table, the binary words are represented by their decimal equivalent values, e.g., "0110" is listed as "6". In the example of TABLE I, the coring reference values are UR = +2 and LR = −1. The various digital signals are identified by letter combinations corresponding to the designations given in FIG. 1; for example, CS indicates the contents of buffer 32 during a given clock cycle. In addition, CS' is used to indicate the updated value of CS produced at the end of a given clock cycle and continuing into the next clock cycle.

TABLE I

| Digital Signals: | Input Signal | CS | UR | LR | UTS | LTS | UDS | LDS | RDS | CS' |
|---|---|---|---|---|---|---|---|---|---|---|
| Clock Cycles | | | | | | | | | | |
| 1 | 0 | 0 | 2 | −1 | 2 | −1 | 0 | 0 | 0 | 0 |
| 2 | 2 | 0 | 2 | −1 | 2 | −1 | 0 | 0 | 0 | 0 |
| 3 | −1 | 0 | 2 | −1 | 2 | −1 | 0 | 0 | 0 | 0 |
| 4 | 2 | 0 | 2 | −1 | 2 | −1 | 0 | 0 | 0 | 0 |
| 5 | 0 | 0 | 2 | −1 | 2 | −1 | 0 | 0 | 0 | 0 |
| 6 | 3 | 0 | 2 | −1 | 2 | −1 | 1 | 0 | 1 | 1 |
| 7 | 0 | 1 | 2 | −1 | 3 | 0 | 0 | 0 | 0 | 1 |
| 8 | 4 | 1 | 2 | −1 | 3 | 0 | 1 | 0 | 1 | 2 |
| 9 | 1 | 2 | 2 | −1 | 4 | 1 | 0 | 0 | 0 | 2 |
| 10 | 12 | 2 | 2 | −1 | 4 | 1 | 8 | 0 | 8 | 10 |
| 11 | 9 | 10 | 2 | −1 | 12 | 9 | 0 | 0 | 0 | 10 |
| 12 | 12 | 10 | 2 | −1 | 12 | 9 | 0 | 0 | 0 | 10 |
| 13 | 9 | 10 | 2 | −1 | 12 | 9 | 0 | 0 | 0 | 10 |
| 14 | −8 | 10 | 2 | −1 | 12 | 9 | 0 | −17 | −17 | −7 |
| 15 | −11 | −7 | 2 | −1 | −5 | −8 | 0 | −3 | −3 | −10 |
| 16 | −8 | −10 | 2 | −1 | −8 | −11 | 0 | 0 | 0 | −10 |
| 17 | −11 | −10 | 2 | −1 | −8 | −11 | 0 | 0 | 0 | −10 |
| 18 | 12 | −10 | 2 | −1 | −8 | −11 | 20 | 0 | 20 | 10 |
| 19 | 9 | 10 | 2 | −1 | 12 | 9 | 0 | 0 | 0 | 10 |
| 20 | 4 | 10 | 2 | −1 | 12 | 9 | 0 | −5 | −5 | 5 |
| 21 | −4 | 5 | 2 | −1 | 7 | 4 | 0 | −8 | −8 | −3 |
| 22 | 4 | −3 | 2 | −1 | −1 | −4 | 5 | 0 | 5 | 2 |
| 23 | −4 | 2 | 2 | −1 | 4 | 1 | 0 | −5 | −5 | −3 |
| 24 | 0 | −3 | 2 | −1 | −1 | −4 | 1 | 0 | 1 | −2 |
| 25 | 0 | −2 | 2 | −1 | 0 | −3 | 0 | 0 | 0 | −2 |

FIG. 2a illustrates the digital input signals 100 corresponding to the values of TABLE I. Input signals 100 include desired signals 102 (shown in phantom) upon which are superimposed noise signals (not separately shown) alternating between values +2 and −1. The corresponding cored digital output signals CS produced at the output of buffer 32 are shown as cored signals 104 in FIG. 2b.

An alternate embodiment of the comparison apparatus 20, 22, 24 of FIG. 1 is shown by the modification of FIG. 3. Subtractor 50 subtracts upper threshold signals UTS from eight-bit digital input signals received at input 12 of corer 10. The eight-bit difference signal 54 is applied in parallel to the first inputs of respective ones of eight AND gates 56 and the sign bit 52 is inverted and applied to the second inputs of all eight AND gates 56. If the difference is positive (sign bit = "0"; inverted sign bit = "1"), eight AND gates 56 pass the difference signal UDS to eight OR gates 24'. Otherwise, no difference signals are passed, i.e. UDS is zero valued.

Similarly, subtractor 60 subtracts threshold signal LTS from the input signal and applies the difference signals 64 in parallel to first inputs of eight AND gates 66. The sign bit 62 is applied to the second inputs of all eight AND gates 66. If the difference is negative (sign bit = "1"), eight AND gates 66 pass the difference signals LDS to eight OR gates 24'. Otherwise, no difference signals are passed, i.e. LDS is zero valued.

Because only one of difference signals UDS and LDS can be produced by any comparison, adder 24 can be removed and replaced by eight OR gates 24' shown in FIG. 3. Each OR gate receives correspondingly weighted bits of UDS and LDS at respective ones of its inputs and reproduces the bits of whichever difference is present to develop the bits of representative difference signal RDS at the outputs of eight OR gates 24'.

FIG. 4 shows a modification to coring apparatus 10 which operates to develop cored signals having increased magnitudes so as to tend to counteract the reduction thereof introduced by the subtractive process of comparison described above. Upper and lower difference signals UDS and LDS are each compared to the baseline (zero) signal level developed by zero reference source 80. In clocking cycles when difference signal UDS is developed, digital comparator 82 applies a true logic level to the J-input of flip flop FF which sets the Q-output thereof in response to clocking signal CLK from source 34. Multiplexer (MUX) 86 responds to the Q-output being in a set state by gating upper threshold signal UTS to its output to develop cored and restored output digital signal CS" thereat for subsequent clocking cycles.

Similarly, when difference signal LDS is developed, digital comparator 84 applies a true logic level to the K-input of flip flop FF which resets the Q-output thereof (and sets the $\overline{Q}$-output) in response to clocking signal CLK. MUX 86 responds to the Q-output being in a reset state by gating lower threshold signal LTS to its output to develop cored and restored signal CS" for subsequent clocking cycles.

In this manner, cored and restored signal CS" comprises one of UTS and LTS selected by MUX 86 in accordance with the sense in which the input digital signal last departed from the then present range of coring values; the output of buffer 32 is not used as an output signal in this modification. Note again adders 44 and 46 add the coring reference signals UR and LR to the stored contents of buffer 32 to develop threshold signals UTS and LTS, respectively. As a result, the cored and restored signal CS" developed by the embodiment of FIG. 4 is increased by the values of UR and LR with respect to the cored signal developed at terminal 14 by the embodiment of FIG. 1.

Figure 2B:
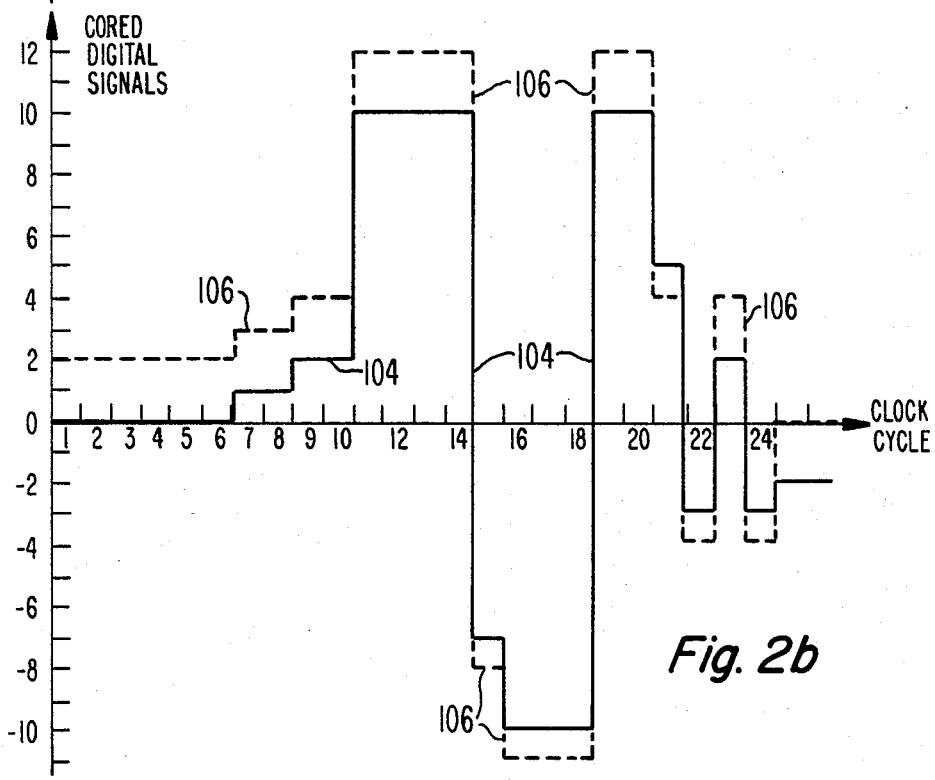
FIG. 2b is a waveform corresponding to the FIG. 2a waveform after being processed by the FIG. 1 apparatus.

For example, in response to input signals 100 shown in FIG. 2a, corer 10 including the modification of FIG. 4 develops cored and restored signals 106 (shown in phantom) in FIG. 2b. TABLE I is correspondingly marked by underscoring to identify the samples of threshold signals UTS and LTS selected by MUX 86 to develop cored and restored signals 106.

Modifications of the above described embodiments are contemplated to be within the scope of the present invention which is limited only by the claims following. For example, where the coring range is centered symmetrically about the baseline signal value, reference signals UR and LR have equal values so that both can be developed by one memory register in source 40. In that case, adder 46 can receive a permanently established negative sign bit or a subtractor can be substituted for adder 46 to subtract signal LR from signal CS.

It is satisfactory in an eight-bit (256 level) apparatus to have a baseline level near the mid-range value. For example, the baseline value can be 127 and the coring range upper and lower boundaries be 129 and 125, respectively. It is noted that the signal processing described herein may be accomplished using other than eight-bit quantization.

What is claimed is:

1. Digital signal coring apparatus comprising:
   a source of digital input signals;
   a source of first and second digital signals having values which determine a range of digital values;
   modifying means coupled to said source of first and second digital signals and responsive to a cored output signal for generating third and fourth digital signals corresponding to time varying upper and lower boundary values of said range of values;
   comparison means coupled to outputs of said source of digital input signals and said modifying means, for producing signal sample values representing the degree to which the input digital signals depart from said range of digital values; and
   means coupled to said comparison means and responsive to said signal sample values for producing said cored output signal by summing successive signal sample values.

2. The apparatus of claim 1 wherein said modifying means comprises combining means for combining said cored output signals and each of said first and second digital signals to produce said third and fourth digital signals.

3. The apparatus of claim 1 wherein said means for producing cored output signals comprises:
   storing means for storing digital signals;
   means for summing said signal sample values and the digital signals stored in said storing means; and
   means for applying said summed digital signals to said storing means.

4. The apparatus of claim 1 wherein said comparison means comprises:
   first and second comparators for comparing said input digital signals to the values representing the upper and lower boundaries of said range of digital values;
   said first comparator developing said signals sample values when said input digital signals are greater than said upper boundary value; and
   said second comparator developing said signal sample values when said input digital signals are less than said lower boundary value.

5. The apparatus of claim 4 wherein said means for producing cored output signals includes:
   a multiplexer having an output terminal at which cored output digital signals are available, having first and second input terminals coupled to said modifying means for coupling the upper and lower time varying boundary values thereto and having a control input terminal;
   means responsive to said first and second comparators for generating a control signal which is applied to said multiplexer control input terminals, said control signal causing said multiplexer to output the upper and lower time varying boundary values for said first and second comparators developing said signal sample values respectively.

6. Apparatus for developing cored digital signals from input digital signals comprising:
a source of input digital signals;
a source of first and second digital reference signals;
storing means having input and output ports, for storing digital signals;
means coupled to said source of first and second digital reference signals and the output port of said storing means for combining digital signals stored in said storing means and said first and second digital reference signals to produce first and second digital threshold signals, respectively;
comparison means, having respective inputs coupled to outputs of said means for combining and said source of input digital signals for producing further digital signals representing the values and senses by which said input digital signals depart from a range of values between said first and second digital threshold signal values;
means coupled to said comparison means and to the output port of said storing means for summing said further digital signals and said stored digital signals;
means for applying said summed digital signals to the input port of said storing means, and wherein the samples contrained in said storing means correspond to cored digital signals; and
wherein said first and second digital threshold signal values tend to track the envelope of said input digital signals.

7. The apparatus of claim 6 wherein said comparison means comprises:
first comparator means for providing a positive difference digital signal corresponding to said further digital signal when the value of said input digital signal is greater than said first digital threshold signal;
second comparator means for providing a negative difference digital signal corresponding to said further digital signal when the value of said input signal is lesser than said second digital threshold signal.

8. The apparatus of claim 7 wherein said comparison means further comprises an adder to which said positive difference and negative difference digital signals are coupled for providing said further digital signal.

9. The apparatus of claim 7 wherein said first and second comparator means each include a substractor for providing a difference signal and gating means responsive to the sign of said difference signal for providing said positive difference and negative difference digital signals, respectively.

10. The apparatus of claim 6 further comprising:
a source of a third digital reference signal having a predetermined value;
second comparison means for comparing said further digital signal and said third digital reference signal;
means responsive to said second comparison means for selectively providing one of said first and second digital threshold signals as cored output digital signals.

11. The apparatus of claim 10 wherein said means for selectively providing comprises multiplexing means having first and second inputs at which said first and second threshold signals, respectively, are applied, and having a control terminal to which said second comparison means is coupled to cause said multiplexing means to select one of said first and second threshold signals as said cored output digital signal.

12. The apparatus of claim 6 wherein said source of first and second digital reference signals includes memory means for storing said first and second reference signals therein.

* * * * *